United States Patent
Kubik

[15] 3,650,023
[45] Mar. 21, 1972

[54] METHOD FOR FABRICATING FERRITE CORE PLUG-IN DEVICES

[72] Inventor: Peter S. Kubik, South Plainfield, N.J.
[73] Assignee: Bell Telephone Laboratories, Incorporated, Murray Hill, Berkeley Heights, N.J.

[22] Filed: Aug. 8, 1969
[21] Appl. No.: 848,610

[52] U.S. Cl. ....................29/602, 29/627, 336/96, 336/198, 336/205
[51] Int. Cl. ....................H01f 7/06
[58] Field of Search ....................29/604, 625, 626, 627, 602; 336/96, 198, 265

[56] References Cited

UNITED STATES PATENTS 3,469,310 9/1969 Peck et al. ....................29/604
3,451,131 6/1969 Gruenstein ....................29/627
3,077,658 2/1963 Wharton ....................29/625 X

*Primary Examiner*—John F. Campbell
*Assistant Examiner*—Carl E. Hall
*Attorney*—R. J. Guenther and Kenneth B. Hamlin

[57] ABSTRACT

Plastic encapsulated ferrite core plug-in units are fabricated by an injection molding technique utilizing a hollow mold. Conducting paths on and through the units are transferred from the mold to the units such that the conducting paths are in a plane different from the nonconducting surface of the units. Copper plating applied to the entire unit is then removed from the plane established by the nonconducting surfaces only.

10 Claims, 3 Drawing Figures

INVENTOR
P.S. KUBIK
BY Lucian C. Canepa
ATTORNEY

METHOD FOR FABRICATING FERRITE CORE PLUG-IN DEVICES

This invention relates to printed circuit manufacturing techniques and more particularly to improved methods of batch fabricating ferrite core transformer units.

BACKGROUND AND PRIOR ART

Ferrite cores have achieved widespread use in a number of areas, most notably in the computer field as the basic building block of computer core memories. Since the typical application requires the use of large numbers of cores, their value depends largely on the ease and economy with which they can be assembled and integrated into surrounding circuitry. Typically, a number of windings of fine conducting wire must be applied to very large numbers of physically small ferrite cores. Because of the size and number of cores involved, hand wiring, a tedious, time-consuming and expensive procedure, has proved impractical. Further, once the cores have been wound, conducting circuit paths must still be established between the core windings and additional circuitry with which the cores must interact, again a technique requiring a great deal of precision.

A number of methods have been devised in an attempt to minimize these time, cost and precision requirements. In accordance with one such method, for example, a printed circuit board on which have been placed a number of ferrite cores is laminated with plastic. Holes are then drilled through the laminate and circuit board to establish both the windings about the cores and the crossover paths through the board. The holes are then plated with a conducting material to actually form the windings and crossover paths and standard printed circuit techniques are employed to establish circuit paths as required among the holes.

One disadvantage encountered in this and some other prior art techniques is the requirement that numbers of holes be drilled through a base material. The holes may be drilled one at a time, or a drill press may be arranged with a number of simultaneously rotating drills. The first procedure is time-consuming and costly, while the second requires expensive, complex apparatus requiring further expensive retooling should the pattern of holes be varied.

A different method is disclosed in a copending application designated D. W. Hagelbarger et al., Ser. No. 712,741, filed Mar. 13, 1968. According to this method, pin-like protuberances on the base of a rubber mold are plated with copper. A ferrite core is positioned among the pins and epoxy poured into the mold, around the pins and core, such that the pins form conducting paths through the epoxy.

One disadvantage inherent in this and the other prior art techniques is the so-called registration problem whereby the conducting paths through the nonconducting material must be aligned or registered with the conducting paths on the surface of the nonconducting material.

A still further disadvantage is encountered when the circuits of the prior art are completed according to conventional printed circuit techniques. Defective connections are not uncommon, and their likelihood of occurrence requires that the circuits be carefully tested for such defects. Often units including complex circuitry must be discarded because of a single defect. The method of the present invention greatly reduces the incidence of such defects, and where imbedded cores are involved, is ideally suited to the manufacture of small replaceable plug-in units, thus avoiding the necessity of discarding larger, more expensive units.

It is thus an object of the present invention to provide a method for fabricating printed circuit apparatus free of a registration problem.

It is another object of this invention to provide a simplified method of manufacturing printed circuit elements.

It is still another object of the present invention to reduce the cost of ferrite core implementations.

A still further object of this invention is to decrease inaccuracies in the manufacture of printed circuit apparatus and reduce the cost of replacing defective core packages which may be part of such apparatus.

SUMMARY OF THE INVENTION

These and other objects are realized by the method of the present invention which involves a batch-fabrication procedure for printed circuit manufacture. For ease of discussion, the novel process of the present invention will be described by reference to the fabrication of a preferred embodiment in the form of a ferrite core imbedded plug-in assembly.

Briefly, in accordance with one method of the present invention, a separable, two-piece hollow mold suitable for use with an injection molding machine is etched such that a pattern in relief, corresponding to desired circuit paths, is produced on the surface of the mold hollow. In addition, holes are drilled through the walls of the mold corresponding to the proposed placement of conducting paths through the plug-in unit to be constructed. In a typical operation, the mold is separated and metal pins are inserted through the holes in the wall of one of the mold halves such that when the mold pieces are rejoined, the pins extend through the hollow of the mold. A ferrite core is positioned among the pins. Small protuberances on the surfaces of the mold hollow aid in aligning the core during injection. The mold halves are rejoined and the mold is applied to an injection molding device in conventional fashion. Injection molding devices are well known in the art. Typical of such devices are those shown in W. Strauss U.S. Pat. No. 3,427,639, issued Feb. 11, 1969, and W. Ernst U.S. Pat No. 3,001,233, issued Sept. 26, 1961.

The unit produced by the injection molding apparatus is in one embodiment a plastic disc having two faces and an edge and in which is imbedded a ferrite core. Holes through the plastic corresponding to the above-mentioned pins are joined according to circuit requirements by depressions or indentations in the face of the plastic unit. Certain ones of these holes and indentations will comprise the windings for the core, while others will comprise further circuitry and crossover paths through the plastic.

For purposes of description, each face of the disc-shaped plastic units thus produced can be viewed as having a first surface, the nonconducting surface, defining a first plane, and a second surface, the conducting surface, in a second plane parallel to but slightly displaced from the first plane and established by the indentations.

Continuing according to the method of the present invention, then, a plastic unit is plated by an electroless process with a conducting material such as copper over its entire surface including the indentations and holes. An abrasive cloth or paper material is then rubbed across the unit so as to remove plating material from the faces thereof in such a manner as to expose only the desired nonconductive surfaces, the desired conducting surfaces being recessed and easily avoided by the abrading procedure.

Another method in accordance with the present invention provides for the fabrication of printed circuit substrates. According to this method, ceramic or other suitable material in its soft, or unfired state, is pressed against a master having pins protruding from it corresponding to desired conducting paths through the substrate and embossments on the surface of it corresponding to conducting paths to be placed on the face of the substrate. In its soft state, the ceramic is easily pierced by the pins and readily accepts and retains as impressions in its own face the pattern of embossments as it appears on the master. The ceramic is then fired to achieve a rigid structure. Following this, the rigid substrate structure is plated with conducting material over its entire surface, including the impressions and walls of the holes. The plating material is then removed from the nonconducting surfaces, as with the injection molded device described above, by rubbing with an abrasive material.

Accordingly, a feature of the novel processes herein described is the utilization of a single master mold for transferring a pattern onto a printed circuit device or substrate corresponding to both the conducting paths on and holes through the device, the holes and paths being in registration with each other.

Another feature of the processes of the present invention, is the utilization of injection molding apparatus to produce imbedded ferrite core plug-in devices.

A still further feature of the novel processes of the present invention is the utilization of the characteristics of unfired ceramic for applying conducting paths and holes to it.

A still different feature is the use of an abrasion technique to remove plated-on material from selected portions of the circuit area which have been made more accessible to the abrasive material.

A complete understanding of the present invention and of the above and other objects, features and advantages thereof may be gained from a consideration of the following detailed description and the accompanying drawing. It is understood that like reference numbers indicate like elements in the several figures.

DETAILED DESCRIPTION

The novel process of the present invention was developed to facilitate among other things the manufacture of an all-magnetic keyboard requiring a matrix of ferrite cores.

The injection molding technique of the present invention lends itself particularly well to treating each of the cores individually. Accordingly, each core of the keyboard is imbedded in plastic and windings and circuit connections applied to it in such a way that the core units may be "plugged into" the keyboard apparatus.

For ease of discussion, then, the novel process of the present invention will be described with respect to the fabrication of these plug-in type ferrite core units. It should be understood, however, that such a core-by-core fabrication technique forms no necessary limitation on the process. That is, the process is equally well adapted to fabricating arrays of cores and other similar elements.

Figure 1:
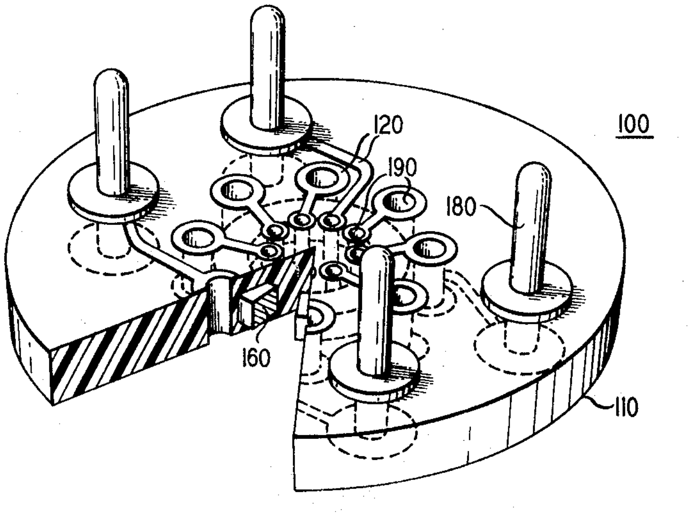
FIG. 1 shows a partially cut-away view of an imbedded core plug-in unit made in accordance with a method of the present invention.

Plug-in unit 100 as shown in FIG. 1 is made in accordance with one method of the present invention. This unit includes the plated conducting paths 120, on the surface of, and the plated holes 190 through the plastic base structure 110. Ferrite core 160 imbedded in the base structure 110 is positioned such that holes 190 form the windings about core 160. To do this, the conducting paths must pass through one hole outside the circle formed by the ferrite core by means of the plating material internal to that hole, across the top of the substrate, through a second hole inside the circle formed by the ferrite core, across the bottom of the substrate to a different hole outside the circle of the ferrite core. Linking a number of holes in this manner effectively produces windings about the core. Gold plated inserts 180 perform the dual function of supporting plug-in unit 100 and providing conducting paths to additional circuit paths.

Figure 2:
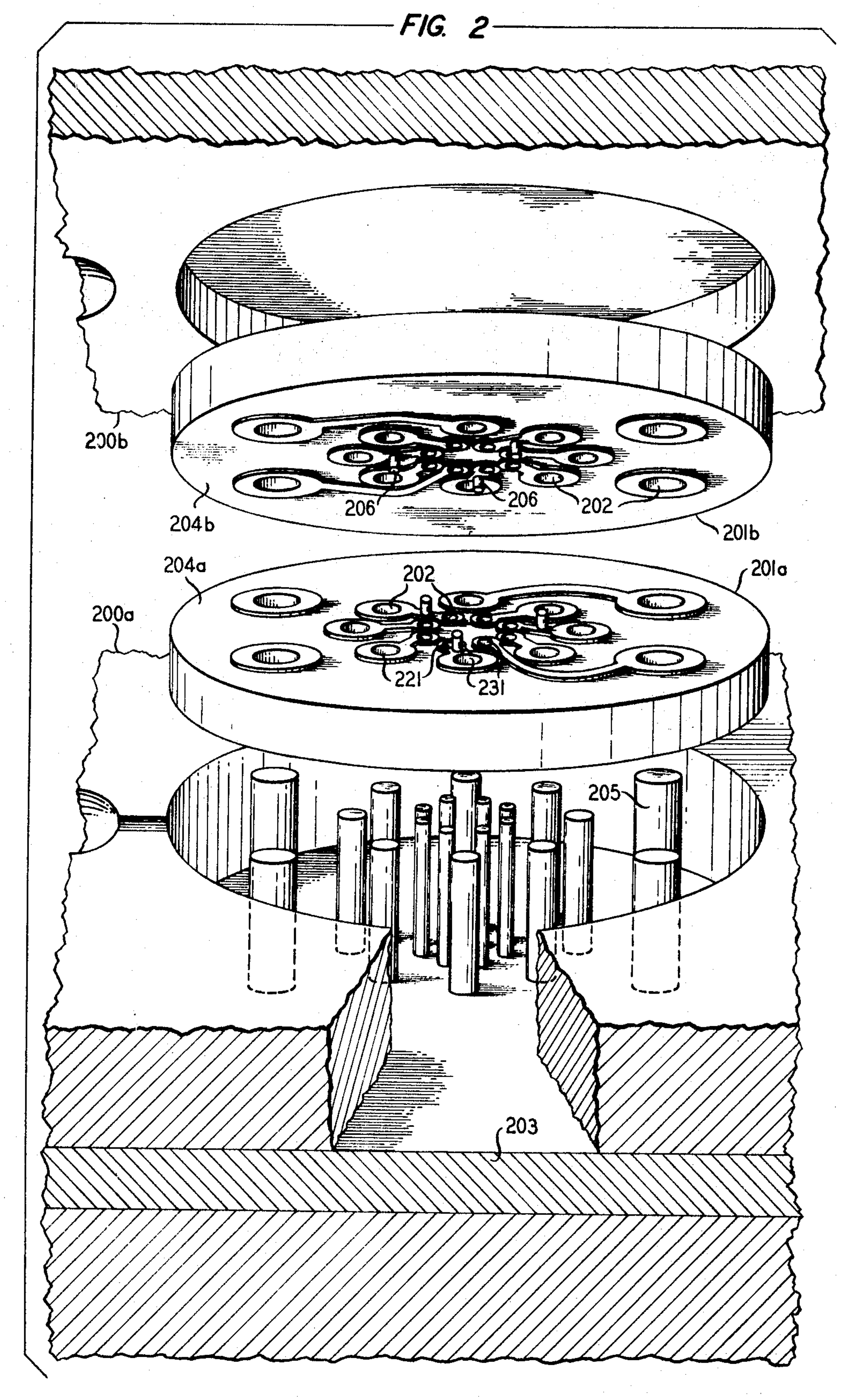
FIG. 2 is an exploded view of the mold halves and die inserts used to form the unit shown in FIG. 1

Initially, mold bases **200*a* and 200*b* in FIG. 2 are formed having appropriate recesses for the reception of master dies 201*a* and 201*b*. Each master die, machined from oil-hardened tool steel or other functionally equivalent material, is conveniently disc-shaped. Patterns are embossed on the faces 204*a* and 204*b* of dies 201*a* and 201*b* by suitable techniques, for example etching. In a typical etching process, dies 201*a* and 201*b*** are coated with a photosensitive photographic emulsion in a darkroom. The emulsion is then selectively exposed to light through a high resolution mask having the proposed circuit paths as a pattern on it. Those portions not exposed are soluble and easily removed with a solvent rinse. At this point an etch is used to produce depressions and, conversely, raised areas on the surface of the master. The raised areas are arranged by the controlled etching process to correspond to the proposed circuit paths.

Holes 202 corresponding to through paths 190 of the unit of FIG. 1 are then drilled through master dies 201a and 201b. A plate 203 is prepared having pins 205 on it exactly corresponding in size and orientation to the holes in the master. In addition, a number (typically three) of nub-like protuberances or positioning elements 206 are placed on the master to prevent the core from sealing against the surfaces of the dies during the injection molding phase. Master dies **201*a* and 201*b* with the appropriate circuit paths in relief thereon are constructed for each face of the plug-in unit. Each pair of master dies 201*a* and 201*b* so prepared is positioned in the recesses of mold bases 200*a* and 200*b*. As seen in FIG. 2, master die 201*a*, for example, has paths 221 embossed on and holes 231 drilled through it and is positioned in mold base 200*a***.

Figure 3:
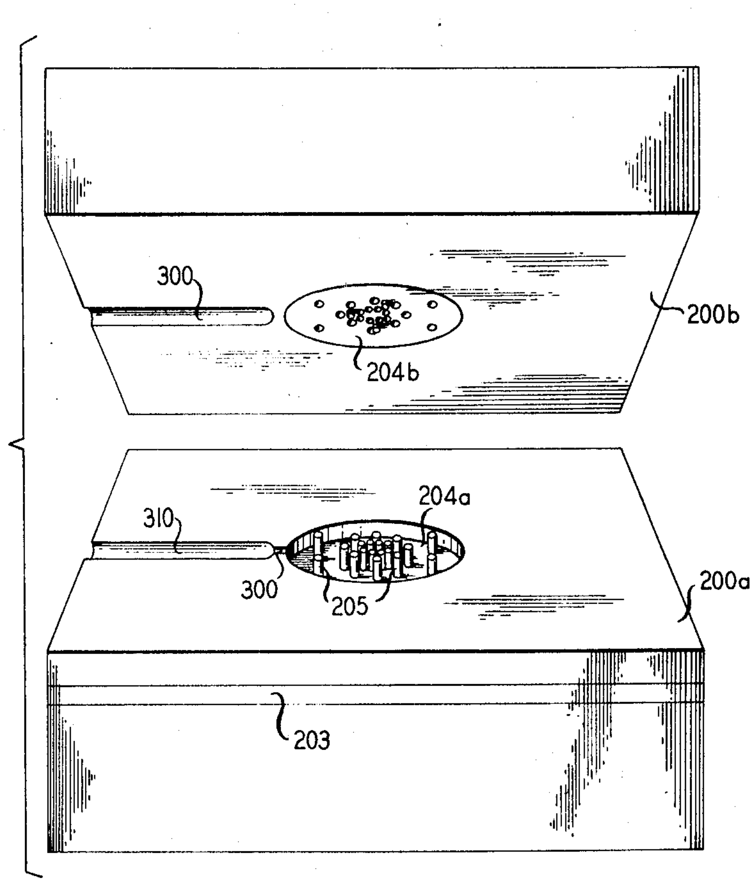
FIG. 3 is a perspective view of the assembled mold halves and inserts used to form the unit shown in FIG. 1.

FIG. 2 shows a pair of mold halves **200*a* and 200*b* with inserted master dies 201*a* and 201*b*. As seen in FIG. 3, dies 201*a* and 201*b* are inset in mold halves 200*a* and 200*b*, one recessed below and one flush with the surfaces of the mold halves 200*a* and 200*b* such that when the mold is assembled a cylindrical cavity is formed bounded by the die surfaces 204*a* and 204*b*** and the walls of the cylindrical cut-out.

A plate 203 having pins 205 projecting from it is positioned in mold half **200*a*, such that pins 205 protrude through the holes of the master die inset in mold half 200*a***.

In accordance with the method of the present invention, once master dies **201*a* and 201*b* have been inset in mold halves 200*a* and 200*b*, a ferrite core is properly positioned among pins 205 protruding through master die 201*a***.

The mold halves **200*a* and 200*b* are then assembled, clamped together and attached to an appropriate injection molding machine. A thermoplastic substance such as glass-filled nylon heated to its flowing condition, is forced under pressure into the mold through gate 300 and sprue 310 and allowed to set, following which the mold is separated and the plastic disc removed. As indicated, positioning elements 206 prevent the ferrite core from sealing against the surface of master dies 201*a* and 201*b* and allow free flow of the plastic about the core. Typically, using the mold described in standard injection molding apparatus, a plug-in unit 0.062 inch thick of nylon 6:10 having a diameter of 0.625 inch can be completely fabricated in 35 seconds at a cylinder temperature of 510° F. Such a unit is shown in FIG. 1**.

Following removal or ejection of the units from the injection molding apparatus, the units are advantageously tumbled in a container of so-called hundred-grit carborundum as a first step in preparing the surfaces for plating. The tumbling is followed by a well-known liquid honing process which further refines the surfaces by cleaning and abrading them. The liquid honing operation is particularly effective for cleaning and preparing the surfaces of the holes for plating.

A thin layer of conducting material such as copper is then applied in accordance with standard electroless plating techniques to the entire surface of the plastic unit, including the insides of the holes. The parallel faces of the disc-shaped units are then abraded to remove conducting material from the nondepressed areas.

The plug-in units can conveniently be viewed as comprising a first or conducting portion which is recessed below the second or nonconducting portion. In effect, then, rubbing the surface of the plastic with a fine abrasive substance removes the plated-on conducting material from only the nonconducting surface. The conducting portion being recessed, remains inaccessible to surface abrasion.

After removing plating from the nonconducting portion, the amount of plating on the conducting paths in and through the plastic may be increased by further plating according to standard techniques. In particular, the above plating and abrading steps may be repeated.

To complete the plug-in units, gold-plated brass inserts 180, as shown in FIG. 1, are placed through certain of the holes and fixed in place. Inserts 180 act both as prongs for plugging the unit into an appropriate circuit board and in addition act as conducting paths between the units and the boards into which they have been plugged.

In an alternate procedure, the method of the present invention can be utilized in fabricating printed circuit substrates without imbedded cores or other such elements. In accordance with this alternate method, ceramic in its unfired state is cut to the size and shape of a proposed circuit substrate, due consideration being given to the reduction in size experienced during firing. In its unfired condition, the ceramic is soft and highly retentive of impressions produced in its surface. Consequently, an extremely fine array of conducting paths embossed on the surface of a die can be transferred to the unfired ceramic by simply pressing the master against the surface of the ceramic substrate. The dies may be made, for example, by the techniques described above.

Holes through the ceramic for crossover paths may also be applied to the ceramic by attaching to the die pins corresponding to the holes. Once the pattern of conducting paths and holes has been transferred to the soft ceramic, it is fired to achieve a rigid structure. As with the above-described injection molded device, the resulting structure exhibits conducting paths (valleys) and nonconducting paths (plateaus). The entire substrate including conducting and nonconducting paths is then plated by an electroless or other similar process. Plating material is then easily removed by rubbing the nonconducting surfaces with an abrading material, the conducting paths having been made less susceptible to that abrasion by being recessed below the conducting paths. Again, the plating in the conducting paths may be reinforced by a further plating according to well-known techniques. As indicated above, this method is inexpensive, accurate and avoids the problem of registering crossover and conducting paths since the two are registered on the dies first.

It is understood that the above-described methods are only illustrative of the application of the principles of the present invention. In accordance with these principles, numerous other methods may be devised by those skilled in the art without departing from the spirit and scope of the invention. In particular, it should be noted that a wide range of plastic or other materials may be employed to form the nonconducting substrates. Also, it should not be inferred that only disc-shaped units are useable in the present invention; the methods described are equally applicable to generate units of any desired shape.

It is also clear that the conducting paths need not be in the same plane or small set of planes if it should be desired to otherwise arrange the impressions made in the material. Also, repeated application of the techniques of the present invention can readily be resorted to for purposes of forming multilayer sandwich-like composite circuit arrangements.

What is claimed is:

1. A method of forming encapsulated ferrite core units and for applying conducting windings thereto comprising the steps of a. forming a mold having at least two separable base portions, which mold portions define a cavity when joined,
b. applying a pattern in relief to the surfaces of said mold portions which surfaces define the interior of said cavity,
c. positioning at least one ferrite core on the cavity-defining surface of one of said separable base portions,
d. joining said separable base portions,
e. filling said cavity with moldable electrically nonconductive material,
f. causing removable pins corresponding to through-paths to protrude through the cavity of said mold, the position of said pins bearing a specified relationship to said core and said pattern.
g. causing said moldable material to assume the shape of said cavity,
h. causing said moldable material to harden, thereby to form said encapsulated ferrite core unit,
i. removing said pins,
j. removing said unit from said cavity,
k. applying a coating of electrically conductive material to said unit including that portion of said unit forming said through-paths thereby to form a plated surface, and
l. selectively abrasively removing plating material from said unit, whereby the resulting plated surfaces on the faces of said unit and the plated paths through said unit intersect to form continuous paths around said encapsulated core, said continuous paths corresponding to conducting windings around said core.

2. A method as in claim 1 wherein the step of applying a pattern in relief to said surfaces of said mold comprises the step of chemically etching selected areas of said surfaces.

3. A method as in claim 2 wherein the step of applying a pattern in relief to said surface further comprises the step of photographically sensitizing selected areas of said surface prior to said chemical etching process.

4. A method as in claim 1 wherein the steps of filling said cavity with a moldable material, causing said moldable material to harden and removing said material from said mold, are performed by an injection molding device.

5. A method as in claim 2 wherein said step of etching the surfaces defining said cavity further includes the steps of a. applying a light sensitive photographic emulsion to said surfaces,
b. exposing selected portions of said emulsion to light,
c. removing the unexposed portion of said emulsion with a solvent, and
d. applying an etching substance to said surfaces such that only those portions of the surface from which the emulsion was removed are etched.

6. A method according to claim 1 wherein said step of applying a coating of electrically conductive material to said unit comprises the step of plating by an electroless plating technique.

7. A method as in claim 1 wherein the step of filling said cavity with moldable material comprises the step of applying said mold to an injection molding device such that said moldable material is injected into said mold by said injection molding device and wherein said step of removing said unit from said cavity comprises the step of ejecting said unit from said injection molding device.

8. A method according to claim 6 further including the step of building up the plating material in said conducting paths by additional plating with conducting material.

9. A method according to claim 8 further including the step of preparing the surface of said unit for plating by tumbling said unit in an abrasive grit material.

10. A method according to claim 9 further comprising the step of preparing the surface of said unit for plating by liquid honing the surface of said unit.

* * * * *